United States Patent [19]

Chika

[11] 4,063,778

[45] Dec. 20, 1977

[54] INDIVIDUAL RESTRAINING DEVICE FOR A VEHICLE USER

[76] Inventor: John J. Chika, 1350 Orchard Ridge Road, Bloomfield Hills, Mich. 48013

[21] Appl. No.: 168,314

[22] Filed: Aug. 2, 1971

[51] Int. Cl.² ............................................. A62B 35/00
[52] U.S. Cl. .................................................. 297/389
[58] Field of Search ............... 297/384, 385, 386, 387, 297/389, 390, 392; 280/150 SB; 9/336, 337; 128/134, 133; 224/5 B, 5 BC

[56] References Cited

U.S. PATENT DOCUMENTS

| | | | |
|---|---|---|---|
| 636,108 | 10/1899 | Blackman | 297/389 |
| 1,423,633 | 7/1922 | Smith | 9/336 |
| 1,848,313 | 3/1932 | Buresh | 297/385 X |
| 2,223,276 | 11/1940 | Ward | 297/392 X |
| 2,275,450 | 3/1942 | Manson | 297/389 |
| 2,314,354 | 3/1943 | Jefferson | 24/73 B |
| 2,691,759 | 8/1937 | Johnson | 297/392 X |
| 2,808,632 | 10/1957 | Cline | 24/115 H |
| 2,833,555 | 5/1968 | Zotkewicz | 297/389 |
| 2,856,991 | 10/1958 | Princiotta | 297/389 |
| 2,876,829 | 3/1959 | Johnson | 297/389 X |
| 2,908,324 | 10/1959 | Muller et al. | 297/389 |
| 3,178,226 | 4/1965 | Cates | 297/389 |
| 3,218,104 | 11/1965 | Putman | 297/389 |
| 3,306,662 | 2/1967 | Finnigan | 297/389 |
| 3,380,776 | 4/1968 | Dillender | 297/389 |
| 3,397,026 | 8/1968 | Spina | 24/115.8 H |
| 3,534,979 | 10/1970 | Barecki et al. | 297/389 |
| 3,583,600 | 6/1971 | Scott | 224/5 R |
| 3,667,805 | 6/1972 | Apri | 297/389 |
| 3,692,361 | 9/1972 | Ivarsson | 297/385 |

*Primary Examiner*—James T. McCall

[57] ABSTRACT

An individual, personalized body restraining device for seat occupant of a seat of any fast moving conveyance, the device including in its basic configuration the protective elements of the seat belt, two shoulder straps, chest shield, head and chin guard, with a head rest and stomach plastron optional; the assembly including easily adjustable, quickly attachable and detachable means of fastening it to secure members of said conveyance; two of them at the usual locations used by the existing safety belts, and the third positioned back of and preferably substantially inboard of its user's head, together with means of adjustments to allow positioning of this unique device into any desired relationship to its user's body when he is seated in said seat.

40 Claims, 39 Drawing Figures

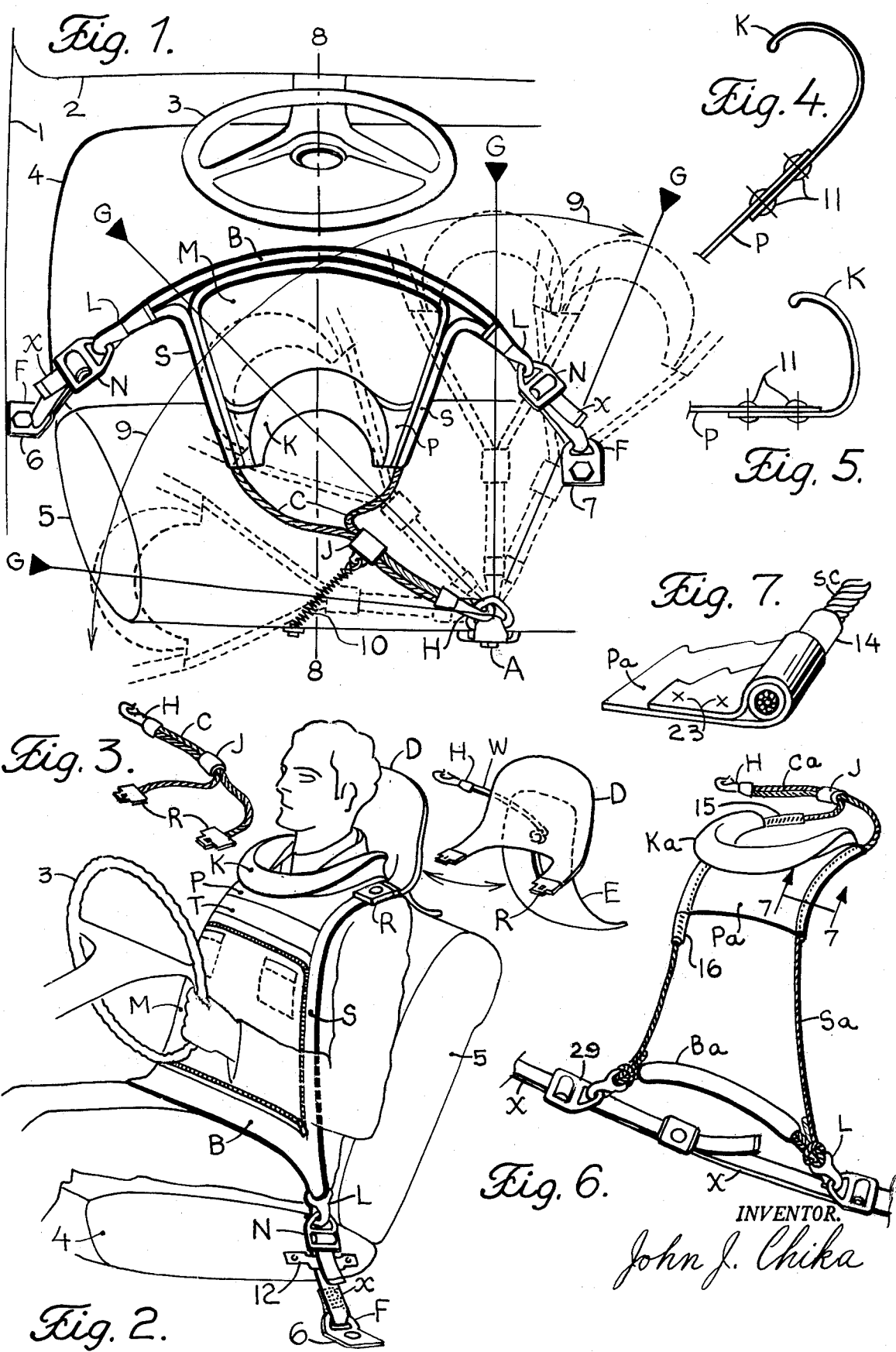

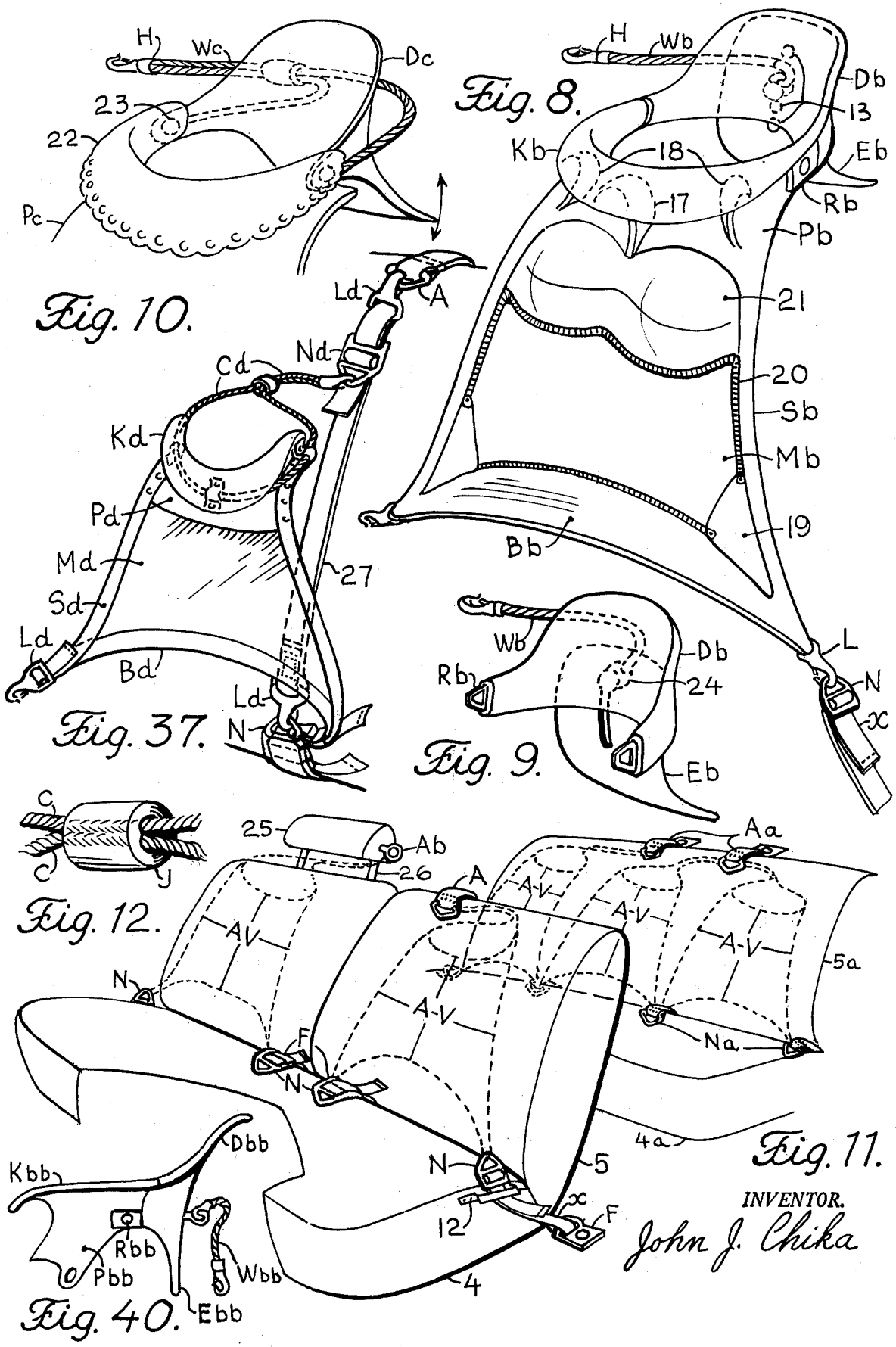

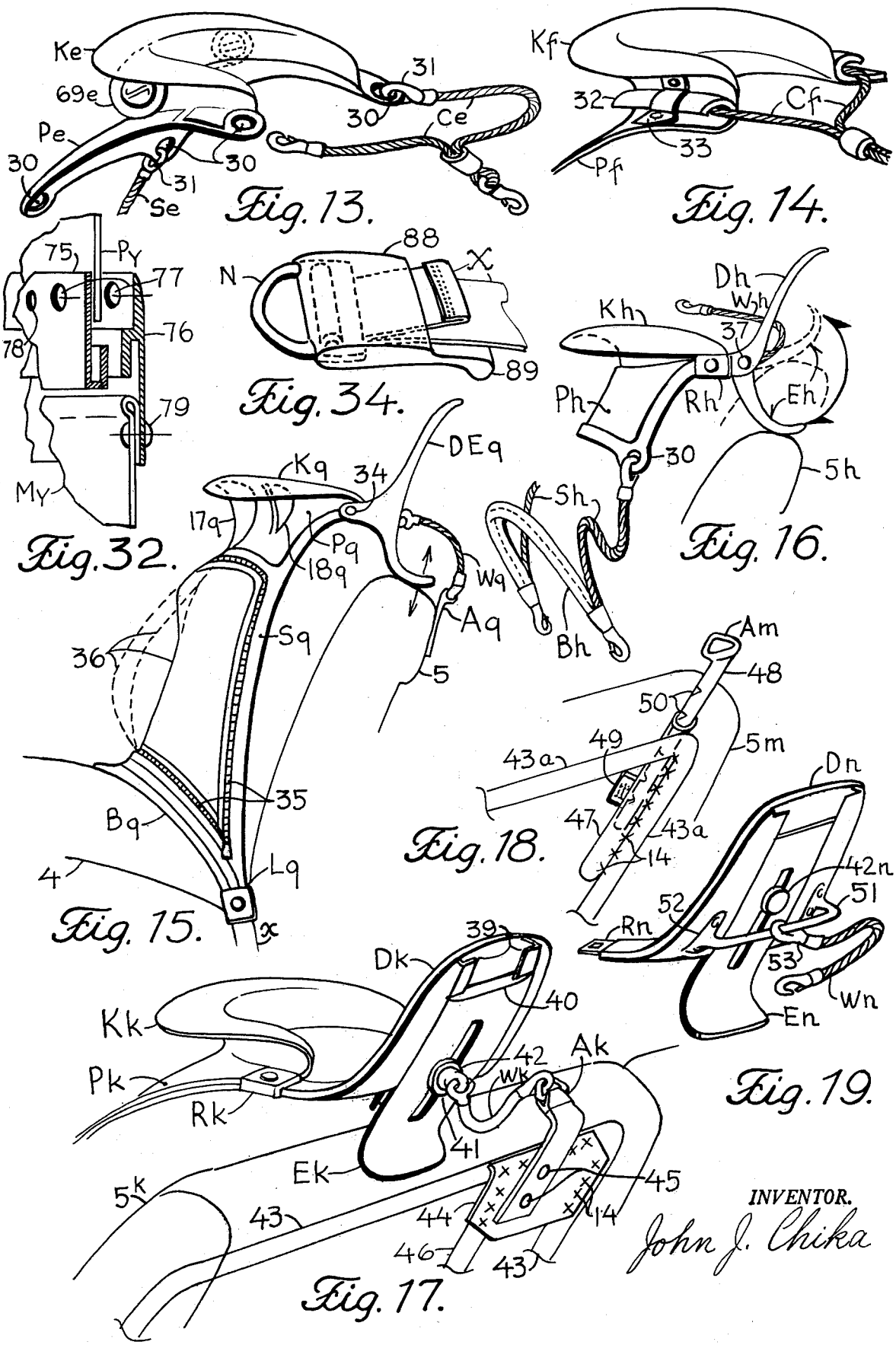

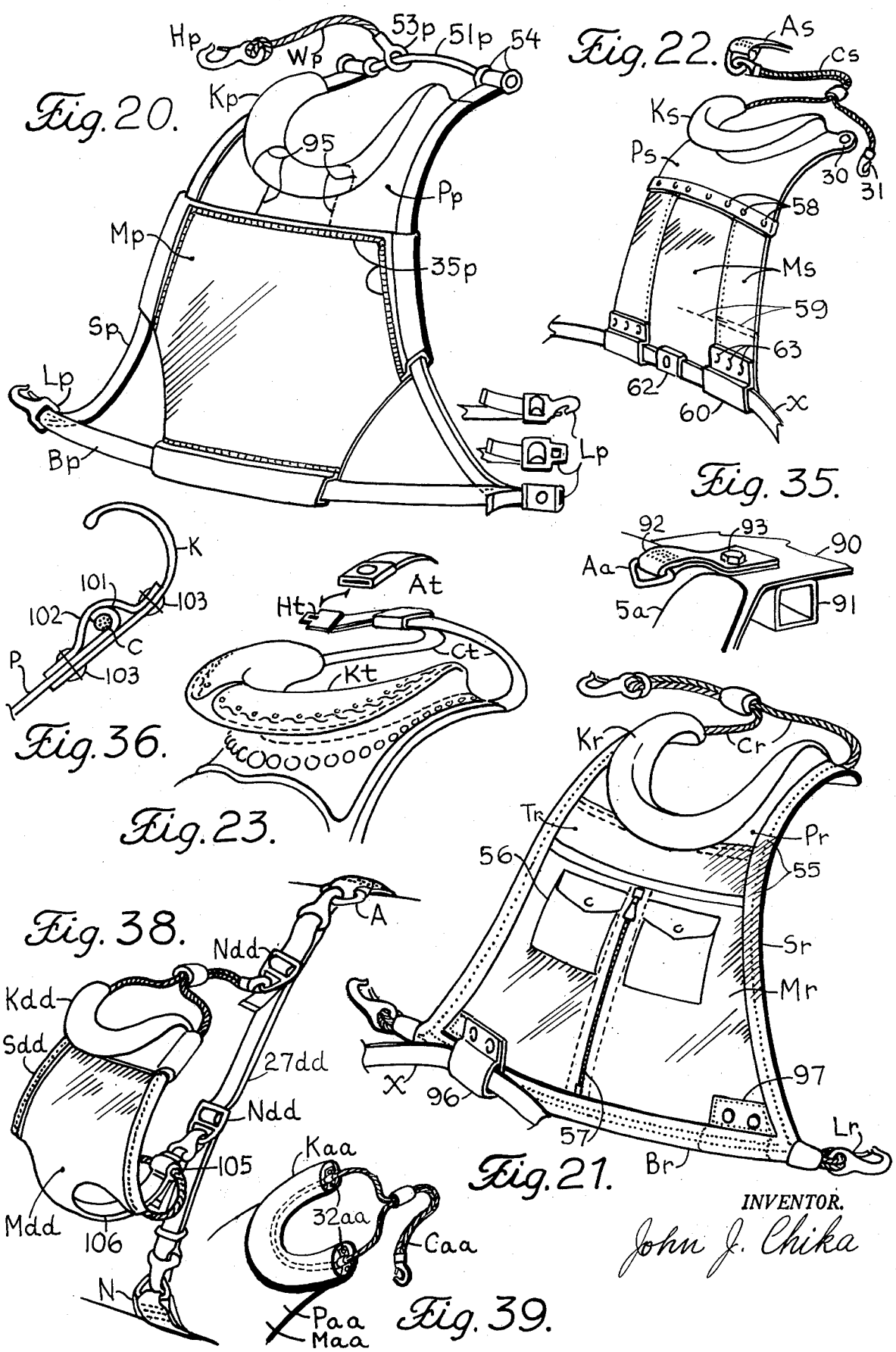

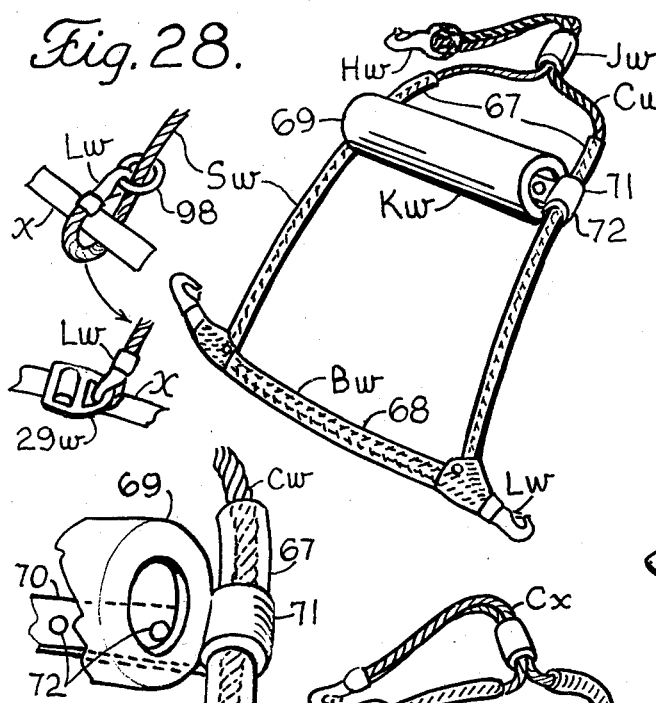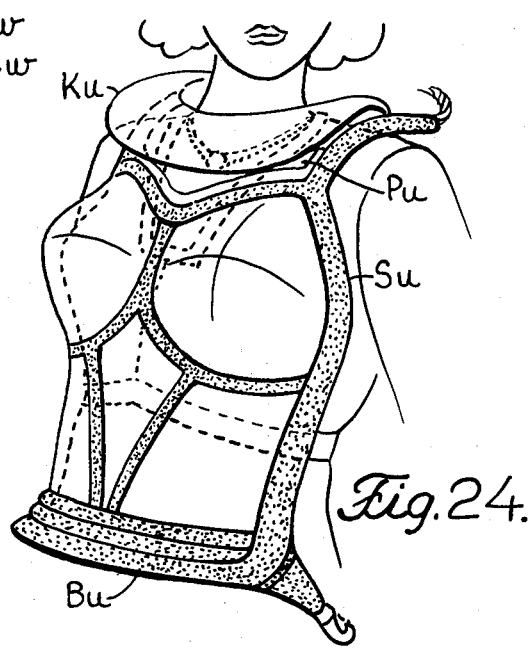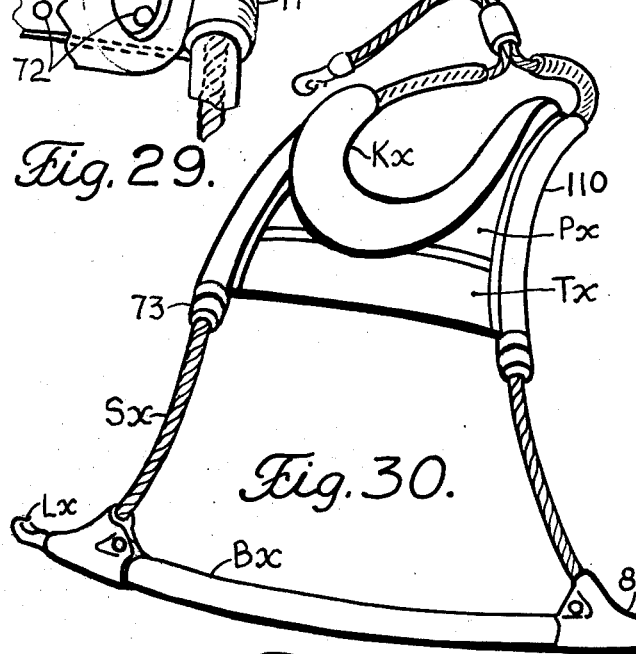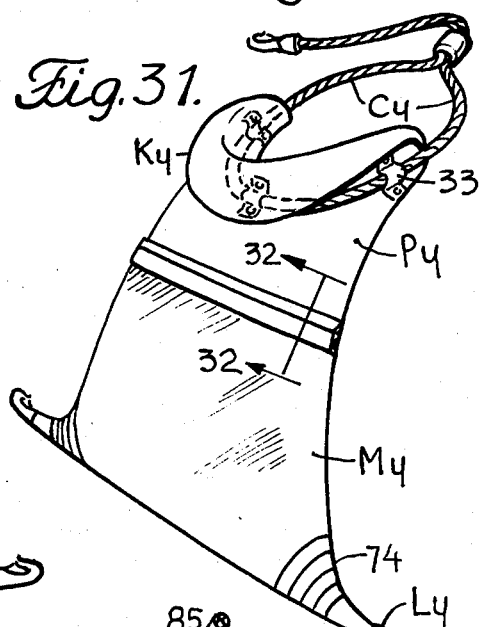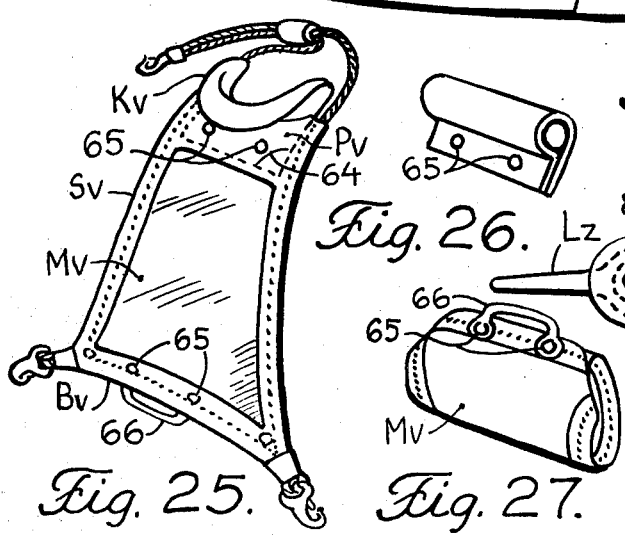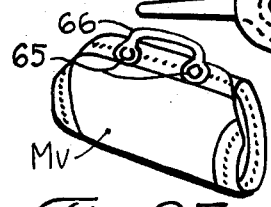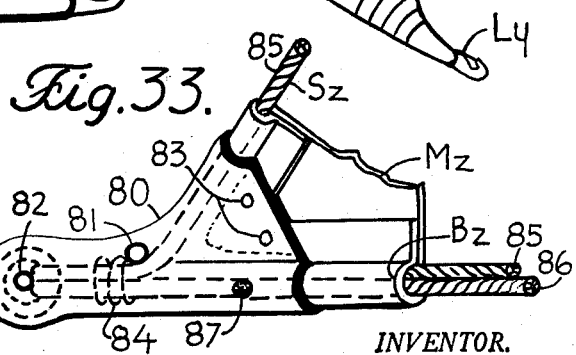

INDIVIDUAL RESTRAINING DEVICE FOR A VEHICLE USER

SUMMARY OF THE INVENTION

This invention relates to the personal, individually fitted and styled, universally adaptable restraining or "packaging" device for a seat occupant of any type of a fast-moving vehicle. It is an attempt to make the subject of traveler safety more palatable to the public, in hope that it will be accepted with the same open mindedness as other special protective attire for sports and other hazardous activities. Furthermore, it is predicated on the precept that travel safety should be a matter of personal choice and every individual's effort and diligence to avoid injury to himself, rather than dependence on some miraculous, infallible, sophisticated and expensive "passive" means of automatic salvation, which may or may not work when needed. The present invention, which I will herein refer to as an "AUTO-VEST," will give protection to everyone using it in minor as well as major collisions. It could be produced in all sizes and styles to suit everyone's taste, in summer and winter models, for "dress-up" or every-day use just like any other specialized garments and accessories are used today; it could be of such simple materials as jute, rope and split bamboo, of any type of suitable synthetic materials or any other combinations of sufficient means as they would be available and preferred by the public taste and always used by the safety minded travelers instead of just cluttering the vehicle interiors as the existing safety belts are doing.

The benefits of my invention are numerous.

1. It keeps its user in his seat even during prolonged collisions, away from injurious contacts with the hard surfaces of the vehicle interior.
2. It is effective in any severity of impact, from any direction.
3. It prevents severe jacknifing or telescoping of its user under or over it.
4. Whiplash and other head injuries are eliminated.
5. The total inertia of the user is absorbed by a large area of the torso, thus eliminating spine loading injuries.
6. It is usable interchangeably in various vehicles.
7. It is very low in original price, easily, instantly inspected and economically maintained, and easily checked for usage by authorities.
8. It allows any amount of movement desired by its user.
9. It is economically adaptable for use in to all existing vehicles. Other advantages of my invention will become apparent upon consideration of the present disclosure in more detail with reference to the accompanying drawings:

BRIEF DESCRIPTION OF THE DRAWINGS

FIG. 1 shows a diagrammatic plan view of my invention applied to the driver's seat of a car, explaining the working principles and general configuration of it.

FIG. 2 is a perspective view of the device as used by a driver of a car which has no head rest;

FIG. 3 is showing alternate means of attachment which would replace the head rest assembly in a car which already has a head-rest on it on its seat;

FIG. 4 is a sectional view through the collar part of the head guard assembly taken under the chin;

FIG. 5 is a sectional view through the collar part of the head guard assembly taken towards the back end over the user's clavicle FIG. 6 is a perspective view showing one of the minimal embodiments of the invention;

FIG. 7 is a sectional view taken through line 7—7 on FIG. 6;

FIG. 8 is a perspective view of another embodiment of my invention, in which the whole assembly except the hardware is molded of synthetic materials with variation of interchangeable stomach panel inserts;

FIG. 9 is a perspective view of a different head rest assembly showing another means of head rest support and its adjustment means;

FIG. 10 is a perspective of another head rest assembly;

FIG. 11 is a perspective diagrammatic view of an automobile showing the typical system of anchoring means required to be furnished by the manufacturer for the use of the AUTO-VEST.

FIG. 12 is a perspective view of slidable adjuster means for the head connecting means such as cables;

FIG. 13 is a perspective view of another embodiment of connecting means between the chest plate and the shoulder-strap means;

FIG. 14 is a perspective view of still another embodiment of connecting the chest plate to the shoulder-strap means;

FIG. 15 is a side elevational view showing the autovest with one piece, swingably adjustable head rest means, replaceable stomach panel and reinforcing means between the chest plate and the collar section of the head guard molded into one assembly;

FIG. 16 is a perspective view showing another embodiment of my invention, with the mid-panel omitted, the rigid chest plate supporting the head guard and head rest assembly which has its lower portion swingably adjustable to fit the height of the seatback rest cushion and which has on its bottom corners means of attachment for the shoulder-strap elements.

FIG. 17 is a perspective view showing in more detail one of possible embodiments of the head rest assembly with slidable height adjustor and a typical means of securing the head anchoring means to a typical seatback structure;

FIG. 18 is a perspective view showing one of possible embodiments of adjustable means for the head anchor installation;

FIG. 19 is a perspective view of the back of the headrest assembly, showing still another means of securing the chest plate-headrest assembly to the head anchor means;

FIG. 20 is a perspective view of another adaptation of my invention wherein various types of safety belt webbing are employed in combination with a rigid rod positioned back of the user's head and forming a part of the head connector means;

FIG. 21 is a perspective front view of my invention as adapted to the use of cables, also showing variations of the stomach panel;

FIG. 22 is a perspective showing one of the possible adaptations of the safety device to be used with existing seat belts;

FIG. 23 is a perspective view showing another combination of the chest shield and head guard, with the head connectors of webbing;

FIG. 24 is a perspective view showing another design variation in which transparent materials could be used for some sections or the whole unit could be molded of transparent material;

FIG. 25 is a perspective view showing one of the very simple but still effective adaptations of my invention for use by an occasional traveler;

FIG. 26 is a detail perspective of the combined head guard and chest plate insert for use in the adaptation as shown in FIG. 25;

FIG. 27 shows in perspective the auto-vest described in FIG. 25 as it would appear when folded for storage or easy carrying by its user when not traveling;

FIG. 28 is a perspective view of another design modification of the invention wherein the lap-belt and shoulder-strap elements are of a cable means partially enclosed in synthetic tubing and the modified head guard is vertically adjustable over the shoulder-strap means;

FIG. 29 is a detail perspective of a typical way of slidably attaching the head guard to shoulder-strap means;

FIG. 30 is a perspective view of another adaptation of the invention in which the chest-plate and head-guard are combined in a unit which is vertically adjustable;

FIG. 31 is a perspective view showing another modification of the auto-vest, wherein the shoulder-straps are eliminated and the chest guard is attached on its bottom to a plastron which has its two bottom corners adapted for proper means of attachment;

FIG. 32 is a cross sectional view through the connecting means of the chest-plate and the plastron as shwon by arrows 32—32 in FIG. 31.

FIG. 33 is a detail drawing of the molded hand grip to accomodate the connecting means of lap-belt hook-up means;

FIG. 34 is a detail perspective view of a typical housing for enclosing the lap-belt anchor means;

FIG. 35 is a cross sectional view showing one of many ways of attaching the top anchor means to adjacent structure;

FIG. 36 is a sectional view showing detail of another variation in the head-guard construction;

FIG. 37 is a perspective view of another embodiment of my invention as adapted for protection of children;

FIG. 38 is a perspective view of still another embodiment of my invention as adapted for protection of infants;

FIG. 39 is a side perspective of another head-guard means;

FIG. 40 is a side elevational view of still another embodiment of combining the head-guard with the head-rest.

DESCRIPTION OF THE PREFERRED EMBODIMENTS

FIG. 1 shows a diagrammatic plan view of the driver's portion of an automobile front seat illustrating working principles of my invention. The interior surfaces of the auto body 1, the instrument panel 2, the steering wheel 3, together with the steel and glass areas not indicated represent the areas of greatest hazard to the driver under collision situations. The driver sits on seat cushion 4, and reclines against seat-back cushion 5. The safety belt of today is commonly mounted to the floor of the car at locations 6 and 7, and assumes a contour as generally indicated by the lap belt element B in the drawing.

The head anchor means A is scurely mounted to the frame structure of the seat-back cushion 5, made secure and rigid enough to take the stress exerted upon it by anchor means A in case of collision, and is located substantially inboard from the center line 8 of the driver's body. If the front seat 4–5 is adjustable, the lap-belt anchors F must have adjustable means such as safety belt webbings X, so that the connecting means N are always at the proximity of intersection of seat cushion 4 and bottom of cushion 5.

For the sake of greater clarity in this description, the two shoulder-strap elements are subdivided into lower side portions as S and upper head connector sections as C, although they always function together as "shoulder-strap elements" SC, and in many embodiments of this invention they are of one continuous length of material from their connection to the lap-belt B to their top anchoring means at H.

The heavy line indicates the AUTO-VEST assembly under normal driving conditions. The head connector cables C are loosely suspended between the anchor means A and driver's shoulders. He has freedom of movement for his torso in any direction as indicated by the radial line 9, but not further; not into the windshield, steering wheel, glass and pillars, or any other injury producing surface. When the slidable adjustment means J is pulled toward the head connector H, the cables C create larger loop for ease of putting the device over user's head if necessary; later the adjustor J is pulled toward the user's head to suit his comfort. Helper spring means 10 may be provided to keep cables C from resting on his shoulders.

Under impact conditions the lap-belt means B function in the usual manner, but there the similarity ends. The inertial load of the user's torso forces the head cables C to straighten out from the anchor means A, toward the direction from which the impact is coming, as indicated by arrows G, causing a slight "jack-knifing" of the torso, thus preventing any tendency to slide under or over the device, and keeping the face and head from coming into any injurious contact with any hard surface of the vehicle interior.

The efficiency of this invention may be easily checked anytime by its user by simply putting it on and leaning forward and sideways, to feel how far the AUTO-VEST will allow him to swing, and adjusting it according to his wishes.

FIG. 2 shows the driver sitting in normal driving position behind the steering wheel 3, on seat cushion 4, resting against seat back cushion 5, wearing the Auto-Vest. In this configuration the lap belt B is of proper material equal in strength to the existing safety belts X while the vertical side connecting means S are of proportionate strength and are attached securely on their lower ends to the lap-belt element B, while on their upper ends they terminate in any conventional, quick release attaching means such as buckles R to which the head rest assembly is attachable.

Between the upper portions of the side connectors S is located chest plate P, connecting the two in transverse relationship, with head-guard K fastened to its top contour, and optional reinforcing plate T in its lower portion, the whole assembly covering generally the whole chest of its user's torso. The chest plate P may be made of any type of metal or molded of any synthetic material affording proper support for the head-guard K under collision circumstances.

The head-guard K may also be made of any metal or synthetic material providing the desired qualifications. As indicated in FIG. 4, which is a sectional view of it taken at its center line under the chin, it is of sufficient radius so that it will not strangle its user during collision, and rigid enough not to collapse under the impact of user's head, and may be attached to the chest plate P by any proper means such as 11. FIG. 5 shows another cross-sectional view through the collar section of the head-guard K, taken toward the back end of it, over the user's collar bone. The head-guard is so designed that the user never sees it or feels the inner contours of its surfaces, and the large diameter section under the chin as shown in FIG. 4 assumes the elongated oval section as shown in FIG. 5, which prevents extreme bending of the head in side impacts; but of course the shape of the collar could be also modified to account for dictates of fashion, specific requirements at hand and changing modes of travel, as long as the safety element would be preserved.

Attachable to the head-guard at R is the head-rest assembly D, which is used in vehicles without built-in head-rests. It may be made of similar materials as the head-guard K, and may have the seat height adjustor means E, to allow the head-guard assembly to rest on the seat-back cushion 5 under normal driving conditions; thus supporting most of the weight of the Auto-Vest. When the head-guard assembly is used, the head connecting means C are replaced by a single, flexible cable means W, centrally attachable to the back side of the head-rest on one end and with quick acting connecting means H on the other end to hook up to the anchor means A. If the vehicle does have built-in head-rests, then head connecting cables C in assembly as shown in FIG. 3 are used; the connectors R are interchangeably connectable. Thus the complete assembly is easily convertible for use in any type of vehicle, and any person owning this combination could travel in safety in any vehicle, provided that the three points of attachment would be furnished.

On the bottom edge of the chest-plate is secured panel M, which connects with the lap-belt B on its bottom and side connectors S on its sides. It may be made of any suitable, sufficiently strong material; may have pockets, closures, zippers and any sundry means of convenience for the user; there is no limit to its possible configurations.

The lap-belt means B and the side connectors S are secured together and terminate in connecting means L which hook-up to the adjustable lap-belt connecting means N attached to the safety belt webbing means X which reaches to the floor anchoring means F and is secured thereto. The belt holding means 12 is used to keep the connector N in easy reach and makes one-hand hook-up possible. Although the three points of suspension are common to all embodiments of my invention, there are many variations of practical attaching procedure as will become self-evident from consideration of the following figures.

FIG. 6 shows one of the minimal embodiments of my invention, in which cables of sufficient strength are used throughout. The proper length cable is folded in half, looped through the head connector H, through the adjustor J, through the sides of the chest plate Pa and down to the lap-belt connecting means L; from there across to the opposite side and returning a few inches away. The double cable resulting in the lap-belt means Ba could be enclosed in plastic tubing to offer larger contact area and to prevent abrasions of the cables Ca. The same treatment could be applied to the side connectors Sa.

The head-guard Ka and the chest-plate Pa could be combined into one unit, stamped or molded of any proper material. The middle panel is completely omitted. As shown in this illustration, any of the embodiments of my invention are adaptable to be used in combination with the existing safety belts X—X, by simply adding any sufficient means of hook-up as 29 to the belts and providing the third anchoring means A to the vehicle.

FIG. 7 is a sectional view taken through line 7—7 in FIG. 6, showing how a metal chest plate P could be formed to contain proper diameter tubing 14 through which the cable Ca — Sa passes. The tubing 14 could extend substantially past the limit of the chest plate Pa as shown at 15 and 16. The fastening means 23 could be rivets, spot welds, snaps, fasteners or any other sufficient means.

FIG. 8 and 9 illustrate an embodiment of my invention as it could be adapted specially for a female user. The whole assembly is molded of clear, flexible material of varying thickness to provide sufficient strength where needed, and even the chest-plate Pb and head-guard Kb could be semi-rigid if provided with plurality of bracing means as 17 and 18 to provide adequate rigidity to the collar section. The shape of the middle section Mb would be fashioned according to the shape, corpulence and style consciousness of the user; it could have certain sections interchangeable or completely left out. The fastening means 20 could be separable fasteners, laces, snaps or any other adequate means. In another configuration, the panels 19 could be left out; in another, even the mid-panel Mb could be omitted; and in still another, only the section 21, below the chest plate Pb would be left out or replaced with only some gauze netting. And for extreme sanitarians a bib-like cover 22 as shown in FIG. 10 may be fitted over the collar, for easy exchange and laundering or disposal.

FIG. 9 shows the head-rest Db removed from its position in FIG. 8, to expose variation in possible means of the head-rest adjustment Eb, by means 24, which could either be locked in any preselected position or be allowed to "float" on top of the seat-back cushion; while the adjustor in FIG. 8 has non-slidable means 13. Of course, the head-rest Db could be omitted and means as shown in FIG. 3 could be used.

FIG. 10 shows one type of non-adjustable, floating type of head-rest Dc in conjunction with connecting means as shown in FIG. 3, except that means R would be replaced by proper means 23 to hook up to the chest plate Pc. Thus the one-piece head-rest Dc would not have to be strong enough to withstand the strain of connector means Wc during collision, serving only one function, that of the head-rest.

FIG. 11 is a perspective view of a typical five passenger sedan showing the system of anchoring means that are required for the proper use of this invention. The front seat 4–5 could retain the existing floor anchor means F, but the seat belts X would be shortened and terminate in adjustable means N. The head connecting anchor means A may be connected to the seat-back frame as shown in FIG. 17 or 18, or by any other sufficient means; if the seat 4–5 would have a head-rest such as 25, which would bear the stress, the anchor means could be attached to it or to the support means such as 26.

The back seat installation is very similar; the existing seat belts are shortened and connected to hook-up means Na, but there is no need for adjustability if the back seats 4a-5a are not adjustable. The top connecting head anchor means Aa are connected to any secured means such as the cross bar of the seat back 5a or as shown in FIG. 35, but only two are required, since the middle passenger may use either one with equal safety. The dotted lines A-V indicate the relative position of the five AUTO-VESTS.

FIG. 12 is a detail perspective view of the head-cable adjustment means J used to regulate the size of the loop that the connecting cables C—C assume. When putting the AUTO-VEST overhead, the user slides adjustor J, in this embodiment consisting of a length of Tygon transparent, flexible plastic tubing of proper diameter, toward the head connector means H, making a large loop out of cables C—C. After the device is over the user's head, connected to anchor means A, and resting in the desired relationship to the user, the adjustor J is pulled toward the user's neck, making the loop as small as desired for the user's comfort.

FIG. 13 is a detail view showing the chest-plate Pe equipped on all four corners with simple connecting means 30, in this case consisting of simple metal rings to which the modified side connectors Se and head-guard connectors Ce may be readily connected by means such as snaps 31 attached to cables Ce and Se. The canister 69e under the collar section would also add rigidity to it.

FIG. 14 shows another means of securing the head connecting cables Cf to the chest-plate Pf by simply looping it under the collar section of the head-rest Kf into specially shaped top side 32 as shown in more detail in FIG. 36; plurality of bracket means 33 spaced around the radius of the chest plate neck opening would prevent the cable from sliding out and also provide stiffeners for the collar section.

FIG. 15 shows in side elevational view another embodiment of my invention featuring interchangeable system for men or women. The lap-belt Bg, side connectors Sg, chest-plate Pg and head-guard Kg are combined in one molded unit, with ribbs 17-18 to strengthen the assembly. One piece head-rest unit DEg is pivotally secured by means 34, and connecting cable Wg is attachable to the head-rest. The fastenning means 35 permit interchangability of panel Mg, from male to female type, skinny or fat, and to follow the trend of current fashion, seasons, occupations or work-a-day and sunday models. The lap-belt connecting means Lg should be of the adjustable type to allow broad range of adjustments for whoever the user may be.

FIG. 16 is an elevational view of another of the inexpensive adaptations of my invention consisting of a rigid chest-plate Ph with connecting means Rh to accept head-rest assembly Dh with its pivotal head-rest adjustor Eh attached by means 37, and on the bottom attaching means 30 to accept cables Sh which double up to form lap-belt Bh.

FIG. 17 is a perspective back view of one of the head-rest embodiments showing in more detail the slidable head-rest adjustor and a typical way of mounting the anchor means Ak. The chest-plate Pk terminates in connecting means Rk supporting the head-rest Dk. The back side of the head-rest is adapted to provide for installation of slidable head-rest means 39 co-acting with means 40 of the head-rest adjustor to allow free vertical movement of it. The securing means 41 attached to the head rest connect with modified cable Wk which is connectable to the regular head anchor means Ak. The locking means 42 allow the adjustor to either travel freely or to be locked in any desired position. To illustrate one of many possible means of securing the head anchor means Ak to the seatback cushion 5k, the seat frame 43 has a steel plate 44 secured to it by means 14 and the anchor means Ak is attached to it by means 45. If necessary, additional tubular member 46 may be provided to add strength.

FIG. 18 shows one of many simple ways to provide for height adjustment for the head anchor means Am. Simple tubular means 47 are secured to the seat frame member 43a by means as 14; inside of the means 47 is slidably inserted steel rod 48 to which is secured head anchor means Am. Spring loaded pawl means 49 engage with the toothed means 50 of the rod 48 to permit vertical adjustment of anchor means Am and locking it at any height.

FIG. 19 is a perspective view of the back of another means of securing the head connector cable Wn to the head rest assembly Dn. A rigid bar means 51 is secured to the sides of the head-rest Dn as by means 52, in line with the chest-plate connecting means Rn and the connecting means 53 of the cable means Wn would allow free slidable movement of the head connector means along the bar 51. The locking means 42n would allow the head-rest adjustor En to slide vertically as needed or could lock it in any position.

FIG. 20 is a perspective view of still another embodiment of my AUTO-VEST in which the lap-belt Bp is preferably of the regular safety belt webbing, while the side connectors Sp may be of lesser but sufficient strength; the two are joined at the means Lp of the lap-belt Bp and their upper ends are secured to the steel bar 51p which has means 54 on each end to accomodate said straps and to prevent them from sliding off in case of a collision. Since the bar 51p is rigid and keeps the straps Sp separated at their top ends, the danger of pinching the user's neck is eliminated and therefore the chest-plate Pp and head-guard Kp may be combined into one semirigid unit just strong enough to restrain the head from whipping action during a crash. The assembly could be made in two sections overlapping through the middle for double strength and as means of transverse adjustment of the head-guard, as suggested by lines 95. The optional middle panel Mp is of any suitable material and the fastening means 35 could be separable fasteners, laces, snaps or any other sufficient means. Also, the lap-belt Bp could have disconnectable, adjustable end means to take any of the hook-up means as Lp interchangeably.

FIG. 21 is a perspective view of another adaptation of my invention showing the use of covered cables. To prevent abrasive wear by fraying of the nylon cables used, the whole AUTO-VEST would be covered by thin but strong material. On the lower portion of the chest plate Pr is secured a rigid reinforcement plate Tr, allowing the head guard Kr to be made of lighter material, and the whole unit from the head-guard down is covered with proper material and double stitched into place; there is no limit of what could be incorporated into the middle panel besides pockets 56 and separable fasteners 57 as shown, or the simple accessory adapter means 96 secured by means 97 and adapting the unit to be used in conjunction with existing belts X.

FIG. 22 shows a perspective view of one of the interim embodiments of the invention for use with the existing seat belts, using one or the other interchangeably. Thus only the head anchor means As would have to be added to adapt the existing vehicles for the use of AUTO-VEST. The collar Ks and chest-plate Ps could be combined into one stamped or molded unit, and the upper corners of the chest plate Ps would have means 30 and 31 to accept head connectors Cs. The middle panel Ms would be of any sufficiently strong material doubled over where needed as indicated by line 59, and secured to the bottom of the chest-plate Ps by proper fastening means as 58. On the bottom, the two double strength vertical sections of the panel would be made longer, creating loops 60 to accomodate the existing belt X with its buckle 62, fastening means 63 completing the unit. The user would first put the AUTO-VEST over his head, hook it into the anchor means As, then fasten the existing seat belt in the regular fashion, and then loop the ends 60 under and over the belt and secure them by means 63.

FIG. 23 is a perspective view of the combined head-guard and chestplate molded as one unit, showing the endless choice of patterns possible to use and still retain the essential safety features of my invention. In this adaptation the head connector means At and Ht are of the quick-release variety and the cables are replaced by webbing means Ct.

FIG. 24 is a perspective view of still another adaptation of my invention, in which the whole assembly would be of molded synthetic materials, preferably transparent, with the bodice of sheer netting or gauze material. The dotted parts represent sections of increased thickness to provide sufficient strength and to distribute the forward inertia load during a collision.

FIGS. 25, 26 and 27 are perspective views showing one of the very simplest but still effective embodiments of AUTO-VEST for the use of an occasional traveler. As shown in FIG. 25, it consists of a simple stamping or molded plastic combination of the head-rest Kv and chest-plate Pv which is inserted into a pocket made in the upper portion of the middle panel Mv, which also encloses the cables Sv and double cables Bv; everything is double-stitched together to make one unit and then the chest-collar section is inserted into pocket 64 and fastened by plurality of fasteners as snaps 65. When not in use, the whole unit folds into a self-contained handbag size unit as shown in FIG. 27, with the snaps on the lap-belt co-acting with the snaps under the collar and the handle 66 attached to the lap-belt by the other halves of snaps 65. FIG. 26 is still a simpler variation of the head-guard combination, consisting of just one piece tube-like unit of sufficiently hard material inserted into pocket 64. The hollow, flanged tube could be used as a storage for traveling needs.

FIG. 28 shows the bar minimum embodiment required to make my invention work. Basically, it consists of one cable doubled in the middle, connected to the head connector means Hw, passing through the adjustor Jw and then entering tubes 67, thus forming side connectors Sw, and looping through hook-up means Lw the two cables pass each other in a larger diameter tube 68, thus forming the Bw lap-belt. The tubes may be of transparent tubing like flexible "Tygon" thus keeping the cables from fraying and presenting larger contact surface to the body. Also, visual inspection of the cables is possible. The chest-plate and head-guard are replaced by rigid tube 69 adapted to form a handy storage for small travel needs. To adapt this embodiment for use with existing lap-belt, the bare minimum configuration would call for eliminating the lap-belt Bw–68 and simply extending the two cables Cw downwards and attaching to each end a hook-means Lw, and providing simple ring means 98 or connector means as 29w to the existing belts X. Of course, the head anchor means A for the head connector Hw would have to be installed in the vehicle.

FIG. 29 is a detail perspective showing the metal strap 70 forming collar 71 to fit over the plastic tube 67 and kept securely in position by fastening means 72 which also attach it to the tube 69. This arrangement also allows the collar tube 69 to be repositioned vertically along the tubes 67, to adjust for various heights of torsos.

FIG. 30 is a perspective view showing an embodiment similar to the one shown in FIG. 28, except that the collar, chest-plate and side connector retainers 110 are all combined into one molded unit, with rigid plate Tx attached to the bottom portion of chest-plate Px, and the whole assembly slidably adjustable over the cables Cx and Sx on stabilized in any desired vertical position by means 73.

FIG. 31 is a perspective view of another embodiment of my invention similar to the one described in FIG. 22, since it has no side connectors at all. The head-guard Ky and the chest-shield Py are combined into one rigid assembly, with means of attaching cables Cy by looping them under the collar of Ky. The bottom edge of the chest-plate Py is provided with slidable connecting means as shown in detail in FIG. 32 to the one piece middle panel My, which may be of any soft but adequate material, and to its bottom corners are attached by means 74 the two lap-belt connecting means Ly.

FIG. 32 is a detail of a cross-sectional view taken through line 32–32 in FIG. 31 showing how the chest-plate Py is attached to channel section 75 by fastening means as 78 and the middle panel My has attached to its upper edge channel section 76, attached by means 79 which is slidably connected with co-acting channel 75; when the two channels are united, they are secured by means such as bolts through holes 77.

FIG. 33 shows detail view of one means of securing the cables Sz and Bz to the lap belt connecting means Lz, and providing a neat, smoothly contoured, molded unit, protecting the cables from abrasion and making the one-hand hook-up easy. The cable 85 passes through the eye of Lz, goes to the opposite side, loops through the other Lz and stops a few inches back. The cable on the other side is looped the same way, and the clamping means 84 hold all four cables together. The housing 80 is shaped to contain all these cables together with fastening means 81, 82 and 83 in one neat unit.

FIG. 34 detail view shows one of many possible means for holding the connecting means N located in front of the intersection of the seat cushion and the back rest cushion, and from being pulled between the two cushions. The housing 88 holds means N rigid enough to allow one-hand looking and unhooking of the device.

FIG. 35 is a perspective of a cutaway showing the typical way of securing the anchor means Aa to a rigid structure of the vehicle. Behind the back seat 5a is located panel 90, underneath which is a rigid structural transverse member as 91. The top anchor means Aa is attached to proper length belt webbing means 92 which on its other end is attached to the structural member 91 by securing means 93 through the panel 90.

FIG. 36 is a sectional view showing the collar section of the head-guard K attached to the modified chest-plate P which has on its top edge radius 101 to accomodate the head connecting cable C, thus eliminating the need for connectors R on the chest plate. Plurality of fastening means 102 keep the cable C within the radius 101 and prevents it from slipping out, and also gives added support to the collar section. Fastening means 103 keep the whole assembly securely together.

FIG. 37 illustrates another embodiment of my invention especially suited for use by youngsters. Basically it could be a scaled down version of any suitable embodiment of the AUTO-VEST previously explained with the following modifications: a separate strap means 27 is provided to reach between any head-anchor means A and a lap belt anchor means N closest to it in its vertical relation; it is secured between these two points as tight as possible by means L*d* at each anchor point, with the slidably adjustable hook-up means N*d* acting as the head anchor for the youngster, thus providing for various heights of the users. Also the lap-belt connecting means L*d* may be of adjustable type to allow lengthening of the lap-belt N*d* to keep up with the growth of the child.

FIG. 38 is a perspective view of still further modification of my invention, to accomodate a very small child either in sitting or standing position. This is accomplished by providing an additional crotch strap 106 which is adjustably secured to means 105 where also the modified side strap means S*dd* are adjustably fastened. The child may be accomodated by simply adjusting the upper and lower means N*dd* along the webbing 27*dd* as needed.

FIG. 39 is a perspective view of still another modification of the head-guard element K*aa* which would be in the shape of a simple tube of the proper radius and bent into the proper curve, made of any suitable material hard enough to prevent collapsing of it during a collision. The head connecting cables C*aa* would be simply pulled through the tube K*aa* and would be secured by means 32*aa* fasteners. The chest plate P*aa* may be a simple metal panel secured to the tubular means K*aa* to form a modified but still sufficient combination head guard and chest shield assembly; and even the chest shield element may be omitted, with just the tubular chin guard element secured directly to the plastron. Thus, the very simplest embodiment would consist of a plastron with two connecting means on the two bottom corners and on the top edge of it the tubular chin guard element would be attached, with the head connecting cable looped through it for hooking to the top anchor.

FIG. 40 is a side elevational view of a two piece rigid combination of the chest plate P*bb*, head guard K*bb* and the head rest D*bb*, formed in two quickly connectable and disconnectable sections by means R*bb* and provided with cable connector W*bb* for quick anchoring. The head rest element does not ride on top of the seat back cushion, but is modified to follow the contour of user's neck and upper back region; thus in whiplash accidents the inertia of the torso would provide sufficient bracing for the head.

It is understood that any section of any of the above described embodiments of my invention may be made of elastic materials, or of materials with limited yield under tension, especially in embodiments designed for female anatomy.

It is further understood that this invention is not to be limited to the exact construction shown and described, but that various departures may be made without departing from my invention. It is obvious from the foregoing brief description of my invention that there are a great many possible variations and combinations and that other operating means could readily be incorporated in the various preferred embodiments, and that the invention is susceptible to further modification, variation, combination and change without departing from the proper scope of fair meaning of the appended claims.

I claim:

1. An individual body restraining device for protection of an occupant of a transport vehicle having a rigid structure and seats, comprising in combination: a flexible lap-belt element transversely spanning the lap of the seated occupant and adjustably connectable and disconnectable to the vehicle structure on the left and right side of the seated applicant; a flexible left and right side shoulder-strap elements anchored at their lower ends to the lap-belt element, with their upper ends reaching upwardly over the occupant's shoulders and joining behind his head for connecting, adjusting and disconnecting to and from the structure of said vehicle and comprising easily operable means to adjust the relative size of the loop formed by them around and back of said occupant's head; a semi-rigid chin-and-neck guard element positioned below said occupant's chin and supported there by a rigid means transversely spanning his upper chest between the shoulder-strap elements and securely attached to them.

2. An individual body restraining device of the character described for protection of an occupant of a transport vehicle having a rigid structure and seats, comprising in combination: a flexible lap-belt element transversely spanning the lap of the seated occupant and adjustably connectable and disconnectable to the vehicle structure on his left and right side; a flexible left and right side shoulder-strap elements anchored at their lower ends to the lap-belt element, with their upper ends reaching upwardly over the occupant's shoulders and joining behind his head for connecting, adjusting and disconnecting to and from the structure of said vehicle back and inboard of his head and comprising easily operable means to adjust the relative size of the loop formed by them around and back of his head; a semi-rigid chin-and-neck guard element positioned below said occupant's chin and supported there by a rigid means transversely spanning his upper chest between said shoulder-strap elements and securely attached to them; and a stomach-plastron element in form of a plyable panel positionable in front of said occupant's torso by attaching it at its top transverse edge to said rigid element spanning his chest, its bottom edge to said lap-belt element and its left and right side edges to said left and right shoulder-strap means.

3. An individual body restraining device of the character described for protection of an occupant of a transport vehicle having a rigid structure and seats, comprising in combination: a flexible lap-belt element transversely spanning the lap of the seated occupant and adjustably connectable and disconnectable to the vehicle structure on his left and right side; a flexible left and right side shoulder-strap elements anchored at their lower ends to the lap-belt element, with their upper ends reaching upwardly over the occupant's shoulders and joining behind his head for connecting, adjusting and disconnecting to and from the structure of said vehicle back and inboard of his head and comprising easily operable means to adjust the relative size of the loop formed by them around and back of his head; a two-section semi-rigid head-guard assembly loosely positioned around occupant's neck comprising: the front section configured as a semi-rigid specially shaped and modified form of a collar positioned loosely below said occupant's chin and partially around the sides of his neck and attached on its front lower edge to a rigid means transversely spanning his upper chest between the shoulder-strap means and secured to them, and the back section configured as a semi-rigid head-rest assembly easily positioned back of occupant's head by means allowing easy connecting and disconnecting of it to the rearward portions of the front collar section.

4. An individual body restraining device of the character described for protection of an occupant of a transport vehicle having a rigid structure and seats, comprising in combination: a specially designed chin-and-neck-guard assembly configured of pressure yealding materials where it is in proximity to occupant's chin and neck, and of semi-rigid materials where it is in proximity to occupant's chest and shoulders, the assembly adapted for loose, adjustable positioning in front and partly around his neck and resting on the top of his shoulders and reaching downwardly and over his chest where it ends in a rigid transverse section configured for easy attachment to a stomach plastron means in form of a soft, plyable panel positionable substantially transversely and vertically in front of his torso and having its bottom section configured to function as a lap-belt transversely spanning his lap and adjustably connectable and disconnectable to the vehicle structure on his left and right side, and two flexible, adjustable securing means quickly attachable and detachable to the left and right shoulder portions of said chin-and-neck-guard assembly at one end, with their other ends joining behind his head for quick connecting, adjusting and disconnecting to and from the structure of said vehicle back and inboard of his head and comprising easily operable means to adjust the relative size of the loop formed by them back of his head.

5. An auxiliary individual body restraining device for protection of an occupant of a transport conveyance having a rigid structure and seats equipped with the lap-type safety belts, comprising in combination: a flexible left and right side shoulder strap elements provided at their lower ends with means for quick connecting and disconnecting to said existing lap-type belts, and with their upper ends reaching upwardly over the occupant's shoulders and joining behind his head for adjustable connecting and disconnecting to and from the structure of said vehicle and comprising easily operable means to adjust the relative size of the loop formed by them around and back of his head; a semi-rigid chin-and-neck guard element positioned adjustably below said occupant's chin and supported there by a rigid means transversely spanning his chest between the shoulder strap elements and adjustably secured to them.

6. A restraining system as defined in claim 1, wherein said lap-belt and shoulder-strap elements are constructed of flexible cables threaded through transparent synthetic tubing where needed; to enlarge their outside diameter so they will present wider and smoother contact area toward occupant's body when restraining it during any sudden and severe deceleration of the vehicle and to protect them from abrassive wear and provide them with smooth, transparent, easily cleaned surface which allows for their easy inspection and replacement when necessary.

7. A restraining system as defined in claim 1, wherein said chin-and-neck-guard element is configured in shape of a tubular cannister to serve as a storage facility for occupant's use.

8. A restraining system as defined in claim 4, wherein said stomach-plastron is configured of such materials which are strong enough to restrain his torso in a collision of said vehicle and tailored to accomodate dimensional configuration of his torso without being bulky and restrictive of his comfort while soft and pliable to the touch.

9. A restraining system as defined in claim 2, wherein said means of attaching said stomach-plastron to said restraining device comprise separable fasteners, snap fasteners, eyelets with cords and any other dependable fastenning means allowing easy removal and installation.

10. A restraining device as defined in claim 2, wherein said stomach-plastron panel is provided with various zippered panels, pockets, closures and openings and other modifications and means of convenience and comfort desired by its user.

11. A restraining device as defined in claim 2, wherein said plastron-element does not cover the entire area defined by said lap-belt, shoulder-straps and chin-guard, but only such portions which are deemed essential for the safety of said seat occupant.

12. A restraining device as defined in claim 2, wherein said lap-belt and shoulder-strap means are combines with said stomach-plastron into one integral unit molded and comprising means at its upper section for attachment of a separate chin-and-neck-guard means to it.

13. A restraining device as defined in claim 12, wherein even said chin-and-neck-guard means are integrated into the molded entity of said restraining device.

14. A restraining device as defined in claim 3, wherein said front section of said head-guard assembly is so configured whereby it terminates at its base in a plate extending downwardly in sufficient width over occupant's chest and upwardly over the top of his shoulders to create a semicircular base for the assembly and comprises four sets of attachment means: on its front bottom edge for attachment to the stomach-plastron means; on its transverse edges for attachment to the shoulder-strap means; and on the rearwardly ends of the shoulder plates one means for quick attachment of the upper sections of the shoulder-strap means and another set of means for quick attachment of the back section of the head-guard means assembly.

15. A restraining device as defined in claim 14, wherein said base for the front section of the head-guard assembly is configured at its front bottom corners to be easily secured to specially modified lower portions of the shoulder-strap means, and at its upper rearward corners to be quickly connectable and disconnectable to the upper portions of said shoulder-strap means.

16. A restraining device as defined in claim 14, wherein said attachment means on the front bottom edge for attachment to the plastron means comprise slidable channels configured for cooperative attachment and locking.

17. A restraining device as defined in claim 3, wherein the two sections of the head-guard assembly are configured to be moldable from synthetic materials of such characteristics whereby they will provide sufficient flexibility, strength and rigidity where and as they are needed, are configured to fit the physical dimensions of its user and are of such styling appearance as dictated by the sex, age and opulence of its user.

18. A restraining device as defined in claim 3, wherein certain portions of said head-guard assembly are padded and other portions provide for easy application of removable covers and accessories.

19. A restraining device as defined in claim 1 wherein said front section of said head-guard assembly is configured to be integrated with said shoulder-strap means and said lap-belt means into one unit allowing it to be molded of proper synthetic materials.

20. A restraining device as defined in claim 3, wherein said front section of said head-guard assembly is molded of synthetic materials and comprises soft and semi-rigis sections as needed and is configured to be securable to a rigid means spanning said occupant's chest and adjustably attachable to said shoulder-straps.

21. A restraining device as defined in claim 3, wherein said front section of said head-guard assembly is configured in left and right halves including means for lateral width adjustment of said device.

22. A restraining device as defined in claim 14, wherein the rearwardly ends of the shoulder plates means comprise means of quick attachment and detachment whereby both the back head-rest assembly and the upper sections of said shoulder-strap means are interchangeably attachable to it.

23. A restraining device as defined in claim 14, wherein the chest plate of said assembly forms a rigid plate configured to be insertable into a pocket means provided for it in the upper part of the plastron means, including means of allowing vertical adjustment of it within that pocket.

24. A restraining device as defined in claim 3, wherein said flexible left and right shoulder-strap means comprice the lower section between said lap-belt and said head-guard assembly, and the upper section from said head-guard to the top means of connection of the device to the structure of the vehicle.

25. A restraining device as defined in claim 24, wherein said upper and lower sections of said shoulder-strap means are configured of varied types of materials in varied combinations of applications and appearances, and for serving varied operative functions.

26. A restraining device as defined in claim 2, wherein the means used for quickly connecting and disconnecting said device to the vehicle structure are configured to be enclosed in modified housings enabling the seat occupant, by using one hand, to locate them easily, position them properly and connect and disconnect them easily to and from correspondingly configured housings which are adapted to accept them instantly and which are attached to the vehicle structure in such away as to facilitate the connecting and disconnecting of the device by either hand of the seat occupant.

27. A restraining device as defined in claim 24, wherein said lower section of said shoulder-strap means extends substantially past the back of user's head where they are secured to a rigid transverse rod means around which is slidably, operably connected a single adjustable cable means for connecting and disconnecting said device to said vehicle structure.

28. A restraining device as defined in claim 24, wherein said upper section means of said shoulder-strap means comprise a single, length adjustable cable means configured to be interchangeably attachable to either side of the rearwardly ends of the front section of the head-guard assembly and to the back side of the back head-rest assembly.

29. A restraining device as defined in claim 24, wherein said upper section of said shoulder-strap means comprise one cable means in form of an adjustable loop connected to the vehicle structure on one end, looping around the front section of the headguard assembly, with its other end also connected to said vehicle structure.

30. A restraining device as defined in claim 29, wherein said looped cable means is positionable and securable around the front outside face of the chin-and-neck part of the head-guard means where its configuration allows it and threaded through it if it is of a tubular configuration.

31. A restraining device as claimed in claim 24, comprising means to keep said upper section of said shoulder-strap means under sufficient tension to prevent them from falling behind occupant's shoulders and causing him unnecessary discomfort when he is reclining in said seat, while still allowing their extension as necessary.

32. A restraining device as claimed in claim 24, wherein the means of adjusting the relative size of the loop back of said occupant's head is configured of two cables, their front ends comprising means for their instant connecting and disconnecting to the rearwardly ends of the shoulder plate means of the front section of the head-guard, and of sufficient length to reach their means of attachment to the vehicle structure, including slidable supporting means operatively cooperating over them to control the size of the loop they form behind occupant's head and to keep them from falling behind his back when in relaxed condition.

33. A restraining device as claimed in claim 3, comprising adaptor means allowing said device to be connectable to existing anchor means provided for existing safety belts, said adaptors being length adjustable to reach from such existing anchor means to left and right side of occupant's hips when he is seated on the seat, including matching means for easy one-hand connecting and disconnecting of the lap-belt means of said device to them.

34. A restraining device as claimed in claim 3, wherein said back section of said head-guard assembly comprise two basic elements: the head-rest element which is quickly and easily attachable and detachable to and from said front section of said headguard and is configured to provide sufficient protection for the back of its user's head in a collision of said vehicle, and the supporting element adjustably attachable to the back side of said head-rest means and configured to rest, glide and brace against the seat-back cushion of said seat, thus normally helping to support and position said device over the upper torso of said occupant and providing protection for his head against any whiplash forces resulting from certain types of collision of said vehicle by bracing said head-rest against said seat cushion.

35. A restraining device as claimed in claim 3, wherein said head-guard means are so configured that when said restraining device is used in a vehicle with its seat-back cushion high enough to protect the back of said occupant's head in a rear-end type of a collision, said back section configured as a head-rest may be ommited from said head-guard assembly, thus making said device adaptable for use with both types of a vehicle seat.

36. A restraining device as claimed in claim 34, wherein said head-rest element comprising on its back side a rigid transverse bar means to which the forward end of the upper section of the shoulder-strap means is quickly attachable for slidable operative engagement with it.

37. A restraining device as claimed in claim 34, wherein said supporting element for said head-rest means is integrated with it into one semi-rigid unit and configured to rest and slide against the user's upper back shoulders.

38. A restraining device as claimed in claim 2, modified for protection of children and people of small stature, comprising: a restraining device scaled down in size to fit its user; an auxiliary adjustable strap-means adapted to be tightly secured at one end to the vehicle structure where the upper ends of the shoulder-strap means are normally attachable to, and the other end attached to the nearest lap-belt attaching means, thus positioning it tightly in substantially vertical position over the front surface of the seat-back cushion, and comprising vertically adjustable anchoring means for connecting the top shoulder-strap means of the device to it, so that a person of small stature may use the device of his size by fastenning his lap-belt means in normal manner and attaching his top shoulder-strap means to said anchor means secured to said auxiliary strap means.

39. A restraining device as claimed in claim 38, modified further to produce a restraining device and a seat combination for small children, wherein said auxiliary vertical strap-means comprise two sets of vertically adjustable buckle type connecting means; the lap-belt and the stomach-plastron elements being combined into one torso sustaining panel with its lower middle portion forming a crotch supporting means reaching under and back of the child's torso for adjustable connection to the shoulder-strap means which are extended downwardly and rearwardly around child's sides to be adjustably joined with the crotch means back of his waist line to form a single point of attaching the device to the lower of the two adjustable buckles on said auxiliary strap means while the top shoulder-strap means are attached to the upper vertically adjustable buckle; thus by positioning the two buckles up and down as needed, any small child may be accomodated in both sitting and standing positions.

40. A restraining device as claimed in claim 2, modified for infrequent use, including fasteners and a carrying handle and so configured that when not used in a vehicle, it may be folded into compact, neat, easily carried and stored hand-bag like unit by folding said head-guard and shoulder-strap means into said stomach-plastron panel means which serve as the wrapper means, kept from unfolding by said fasteners and carried by said handle.

* * * * *

UNITED STATES PATENT OFFICE
CERTIFICATE OF CORRECTION

Patent No. 4,063,778     Dated December 20, 1977

Inventor(s) John J. Chika

It is certified that error appears in the above-identified patent and that said Letters Patent are hereby corrected as shown below:

Below the " ABSTRACT", strike out (39), insert --40 --;

Column 1, line 51, strike out (to),before "all" ;

" 1, " 63, remove ( ; ), insert -- on its seat;--;

" 10, " 18, " ( on ), " --and--;

" 16, " 66, remove (comprising), insert --comprises-;

" 1, " 63, after"rest" insert --on its seat;---.

Signed and Sealed this

Twenty-third Day of May 1978

[SEAL]

Attest:

RUTH C. MASON
Attesting Officer

LUTRELLE F. PARKER
Acting Commissioner of Patents and Trademarks